United States Patent
Fujita et al.

(10) Patent No.: US 9,315,677 B2
(45) Date of Patent: Apr. 19, 2016

(54) AQUEOUS POLYURETHANE RESIN COMPOSITION FOR FLAME RETARDANT COATED MATERIALS AND COATED PRODUCTS OBTAINED BY APPLYING SAID COMPOSITION

(75) Inventors: Naohiro Fujita, Saitama (JP); Nobuyuki Shimamura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 244 days.

(21) Appl. No.: 13/876,610

(22) PCT Filed: Aug. 19, 2011

(86) PCT No.: PCT/JP2011/004634
§ 371 (c)(1),
(2), (4) Date: Apr. 16, 2013

(87) PCT Pub. No.: WO2012/042732
PCT Pub. Date: Apr. 5, 2012

(65) Prior Publication Data
US 2013/0203936 A1 Aug. 8, 2013

(30) Foreign Application Priority Data
Sep. 28, 2010 (JP) .................................. 2010-217220

(51) Int. Cl.
| | | |
|---|---|---|
| *C08G 18/28* | (2006.01) | |
| *C08L 75/00* | (2006.01) | |
| *C08G 18/08* | (2006.01) | |
| *C08K 3/20* | (2006.01) | |
| *B32B 27/28* | (2006.01) | |
| *C08K 5/09* | (2006.01) | |
| *C08K 5/10* | (2006.01) | |
| *C09D 5/18* | (2006.01) | |
| *C09D 5/02* | (2006.01) | |
| *C08G 18/10* | (2006.01) | |
| *C09D 175/04* | (2006.01) | |
| *C08G 18/38* | (2006.01) | |

(52) U.S. Cl.
CPC *C09D 5/18* (2013.01); *C08G 18/10* (2013.01); *C08G 18/3885* (2013.01); *C09D 5/02* (2013.01); *C09D 175/04* (2013.01)

(58) Field of Classification Search
None
See application file for complete search history.

(56) References Cited

U.S. PATENT DOCUMENTS

| | | | | |
|---|---|---|---|---|
| 3,525,705 | A * | 8/1970 | Lichtenberg .................. | 521/169 |
| 3,684,754 | A * | 8/1972 | Barie et al. .................... | 521/157 |
| 8,129,492 | B1 | 3/2012 | Barancyk et al. | |
| 2003/0088045 | A1 | 5/2003 | Haberle et al. | |
| 2010/0152374 | A1* | 6/2010 | Jou et al. ........................ | 524/590 |
| 2012/0037034 | A1 | 2/2012 | Barancyk et al. | |

FOREIGN PATENT DOCUMENTS

| | | |
|---|---|---|
| JP | 48-022200 A | 3/1973 |
| JP | 48-047992 A | 7/1973 |
| JP | 49-050098 A | 5/1974 |
| JP | 52-140541 A | 11/1977 |
| JP | 62-045610 A | 2/1987 |
| JP | 2003-003116 A | 1/2003 |
| JP | 2003-104581 A | 4/2003 |
| WO | 01/60883 A1 | 8/2001 |
| WO | 2009/142999 A1 | 11/2009 |

OTHER PUBLICATIONS

Zhu et al. Synthesis and photopolymerization of hyperbranched polyurethane acrylates applied to UV curable flame retardant coatings, Polym. Int. 51, 223-227 (2002).*
International Search Report for PCT/JP2011/004634 (Oct. 31, 2011).
International Preliminary Report on Patentability for PCT/JP2011/004634 (Apr. 16, 2013).
Abstract for JP 62-045610 A.
Abstract for JP 52-140541 A.
Abstract for JP 49-050098 A.
Abstract for JP 48-047992 A.
Abstract for JP 2003-003116 A.
Abstract for JP 2003-104581 A.
European Search Report dated Feb. 25, 2014 issued in corresponding EP11828300 application (pp. 1-3).

* cited by examiner

*Primary Examiner* — Susannah Chung
*Assistant Examiner* — Robert T Butcher
(74) *Attorney, Agent, or Firm* — Millen, White, Zelano and Branigan, P.C.

(57) ABSTRACT

The present invention is an aqueous polyurethane resin composition for a flame retardant coated material comprised of an aqueous dispersion of a polyurethane resin obtained by extending a chain of an urethane prepolymer in an aqueous dispersion. The aqueous dispersion of the urethane prepolymer is obtained by reacting (a) a polyisocyanate component with (b) a polyol component which contains a phosphorus-containing polyol compound represented by the following general formula (1) as an essential component then dispersed the obtained prepolymer in the water, wherein a unit corresponding to the compound represented by the said general formula (1) is contained so that the phosphorus content in the urethane resin solid is 0.3 to 5.0 mass percent;

$R^1$ in the formula (1) represents an alkylene group having 2 to 4 carbon atoms, and m and n represent a number from 1 to 10.

General formula (1)

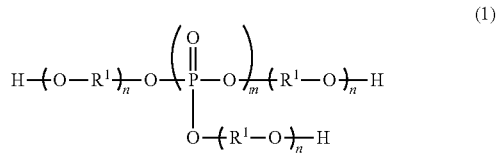

4 Claims, No Drawings

AQUEOUS POLYURETHANE RESIN COMPOSITION FOR FLAME RETARDANT COATED MATERIALS AND COATED PRODUCTS OBTAINED BY APPLYING SAID COMPOSITION

TECHNICAL FIELD

The present invention relates to an aqueous polyurethane resin composition wherein the specified polyol containing phosphorus is an essential component, and to coated articles comprised of coating the said composition, and in particular relates to an aqueous polyurethane resin composition for a flame retardant coated material which can provide a film having excellent flame retardancy, and to non-halogen coated articles requiring flame retardancy, as typified by outdoor tents such as a tent warehouse and a pipe tent as well as net, mesh and sheet which have the above film.

BACKGROUND ART

Polyurethane resin which can provide films and molded articles having abrasion resistance, adhesive properties, non-viscous properties and rubber elasticity or the like, is widely used as a coating material, an adhesive agent, a binder and a coating agent or the like.

In conventional solvent type coating materials, high flammability and odor or the like are unavoidable while at work. Therefore, various improvements such as an improvement of the environment, an advancement of working efficiency and reducing industrial wastes like solvent wastes are required, and aqueous coated materials are expected to be promising from safety standpoints such as prevention of environmental contamination and better labor hygiene.

For example, polyester fibers or nylon fibers have been used for curing net, mesh and sheet which are used at building sites. These polyester fibers and nylon fibers are usually coated with polyvinyl chloride sol in order to impart flame retardancy, waterproof properties, weather resistance and durability to them. Furthermore, plasticizers such as DOP (dioctyl phthalate) could be added to this polyvinyl chloride sol.

However, with concerns about the environment, the request that the above polyvinyl chloride sol should be replaced with other materials has become stronger due to the problem of poisonous gas such as dioxine produced when these curing net, mesh and sheet are burned and the problem that plasticizers such as DOP are environmental hormones.

In addition, although polyvinyl chloride in itself has a certain degree of flame retardancy, it is often the case that a flame retardant is further added. Generally, it is often the case as well that this flame retardant is a compound containing halogens such as bromine and chlorine, thereby poisonous gases such as dioxin are produced, which is a problem. In order to solve these problems, polyphosphate, phosphorous compounds such as aromatic condensed phosphoric acid ester and also an inorganic compound such as magnesium hydroxide are used as disclosed in the following patent documents 1 to 3. However, since the above addition type phosphorous compound has a plasticizing effect as well, when it is added in large amounts, the strength of coating film extremely drops, and also tackiness and bleed phenomenon of the surface of coating film occur, which are problems. In addition, there are problems that as long as a large amount of inorganic flame retardant is not added the coating film cannot have the effect of flame retardancy, and moreover the performances of the coating film such as abrasion resistance and plasticity become poor. In either case, satisfactory coated articles have never been obtained.

PRIOR ART DOCUMENTS

Patent Documents

Patent document 1: Japanese Unexamined Patent Publication Tokuhyo 2001-505239

Patent document 2: Japanese Unexamined Patent Publication Tokkai 2006-206835

Patent document 3: Japanese Unexamined Patent Publication Tokkai 2008-081916

As a result of intensive studies for solving the aforementioned problems, the inventors of the present invention have found that a phosphate ester type polyol compound having a certain polyoxyalkylene structure has superior flame retardancy as well as excellent hydrolysis resistance even if it is mixed with aqueous polyurethane resin, thereby achieving the present invention. This discovery is an amazing discovery, considering that phosphate ester type compound generally has poor hydrolysis resistance, and in particular when mixed with aqueous resin, there is a serious concern about hydrolyzable properties thereof and also the polyoxyalkylene structure having a lot of oxygen atoms is generally recognized as burned easily.

SUMMARY OF THE INVENTION

The Problem to be Solved by the Invention

Therefore, the first object of the present invention is to provide a non-halogen type aqueous polyurethane resin composition which is suitable for imparting a flame-retardant film, which does not cause a bleed phenomenon but is excellent in workability, to the surface of a material.

The second object of the present invention is to provide a coated article which does not produce a harmful halogen compound when burned, having a film which is excellent in flame retardancy and does not cause the bleed phenomenon on the surface thereof.

Means to Solve the Problem

Namely, the present invention is an aqueous polyurethane resin composition for a flame retardant coated material comprised of an aqueous dispersion of a polyurethane resin obtained by extending a chain of an urethane prepolymer in an aqueous dispersion which is obtained by reacting (a) a polyisocyanate component with (b) a polyol component which contains a phosphorus-containing polyol compound represented by the following general formula (1) as an essential component then dispersed the obtained prepolymer in the water, wherein a unit corresponding to the compound represented by the said general formula (1) is contained so that the phosphorus content in the urethane resin solid is 0.3 to 5.0 mass percent; and a coated article obtained by coating the said composition on an article.

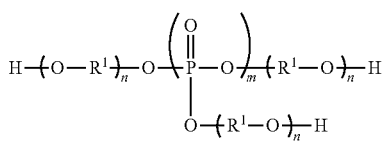

$R^1$ in the formula (1) represents an alkylene group having 2 to 4 carbon atoms; m and n represent a number from 1 to 10.

In the present invention, it is preferable in particular that m is a number from 2 to 5, and n is a number from 2 to 3.

Effect of the Invention

The aqueous polyurethane resin composition for a flame retardant coated material of the present invention, which contains a phosphorus-containing polyol component in the urethane skeleton, does not have any surface bleed and can easily impart a coating film having excellent flame retardancy to the subject coating material.

EMBODIMENT FOR CARRYING OUT THE INVENTION

Hereafter, the aqueous polyurethane resin composition for a flame retardant coated material of the present invention will be described in more detail.

The aqueous polyurethane resin composition for a flame retardant coated material of the present invention is not particularly limited in the structure of a raw material and the water-dispersing method or the like, except that the specified polyol component containing phosphorus is an essential component. Therefore, it can be manufactured by publicly-known methods, using publicly-known raw materials such as (a) a polyisocyanate component, (b) a polyol component, (c) an ionic group-introducing component, (d) an ionic group-neutralizing agent component, (e) an emulsifying agent component and (f) a chain-extending agent component.

The polyisocyanate of the component (a) used in the present invention is not particularly limited. It may be a diisocyanate compound or a polyisocyanate compound having three or more isocyanate groups. Examples of the above diisocyanate compound are aromatic diisocyanates such as tolylenediisocyanate, diphenylmethane-4,4'-diisocyanate, p-phenylene diisocyanate, xylylene diisocyanate, 1,5-naphthylene diisocyanate, 3,3'-dimethyldiphenyl-4,4'-diisocyanate, dianisidine diisocyanate and tetramethyl xylylene diisocyanate; alicyclic diisocyanates such as isophorone diisocyanate, dicyclohexyl methane-4,4'-diisocyanate, trans and/or cis-1,4-cyclohexane diisocyanate and norbornene diisocyanate; aliphatic diisocyanates such as 1,6-hexamethylene diisocyanate, 2,2,4 and/or (2,4,4)-trimethylhexamethylene diisocyanate and lysine diisocyanate; and mixtures thereof.

Examples of polyisocyanate having 3 or more isocyanate groups as mentioned above are triphenylmethane triisocyanate, 1-methylbenzol-2,4,6-triisocyanate, dimethyl triphenylmethane tetraisocyanate, isocyanate which consists of mixtures thereof and has three or more function groups and modified materials of isocyanate having three or more function groups such as carbodiimide-modified, isocyanurate-modified and biuret-modified, blocked isocyanate obtained by blocking these modified materials using various types of blocking agents, isocyanurate trimer and biuret trimer of the above diisocyanate.

In the present invention, it is preferable to use 1,6-hexamethylene diisocyanate, dicyclohexyl methane-4,4'-diisocyanate and isophorone diisocyanate among them. This is because the aqueous polyurethane resin composition having, in particular, excellent adhesive properties, corrosion resistance and strength can be obtained.

The greatest characteristic of the aqueous polyurethane resin composition in the present invention is to contain the flame retardant polyurethane which is a reaction product obtained by reacting the polyisocyanate of the above component (a) with the phosphorus-containing polyol represented by the following general formula (1) as an essential component.

General formula (1):

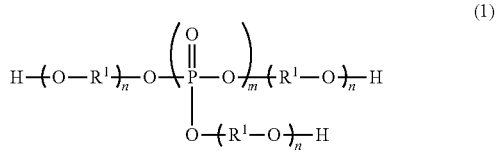

$R^1$ in the above general formula (1) is an alkylene group having 2 to 4 carbon atoms. Specific examples of it are an ethylene group, a propylene group and a butylene group. From the viewpoint of ease of manufacture, the ethylene group or the propylene group is preferable. Furthermore, from the viewpoint of flame retardancy which is the characteristic of the present invention, the propylene group is preferable in particular.

In the above general formula (1), m represents a number from 1 to 10. As m increases, a functional group number (m+2) of hydroxyl group increases. As a result, the crosslink density of urethane resin formed thereby increases. Accordingly, as m increases, the water dispersing properties of urethane prepolymer and the flexibility, which is a characteristic of urethane resin, when formed as a coated film, tend to be damaged. When m is more than 10, the above flexibility is extremely damaged, which is not preferable. In addition, from the viewpoints of the above flexibility and the ease of obtaining the raw material phosphorus compound, it is preferable that m is a number from 1 to 5. It is more preferable that m is a number from 2 to 4, from the viewpoints of the water dispersing properties of urethane prepolymer and the balance between flame retardancy and flexibility in urethane resin coated film formed finally. It is the optimum that m is 2.

In the above general formula (1), n represents a number from 1 to 10. A number from 1 to 5 is preferable and a number from 2 to 3 is more preferable. When n is more than 10, since a polyether chain increases, there is a tendency that flame retardancy becomes poor and the effect of the present invention cannot be obtained. When n is less than 1, not only the problem that an acid group (P(=O)OH) remains occurs, but also the problem that the crosslink density of urethane resin increases due to low molecular weight occurs. Because of these problems, the water dispersing properties of urethane prepolymer and the coated film physical properties of urethane resin decline. Such problems are not preferable. When n is a number from 1 to 10, the balance between the above performances is excellent.

As for the amount of phosphorus-containing polyol used, represented by the aforementioned general formula (1), it is required that the phosphorus content in the polyurethane resin formed is 0.3 to 0.5 mass percent. 0.7 to 4.0 mass percent is preferable, 1.5 to 3.5 mass percent is more preferable. When the amount contained is less than 0.3 mass percent, the effect of flame retardancy is insufficient. When the amount contained is more than 5.0 mass percent, the water dispersing properties of urethane prepolymer, storage stability of aqueous polyurethane resin composition and mechanical physical properties of polyurethane resin coating film are insufficient respectively.

Polyols other than phosphorus-containing polyol represented by the general formula (1), which can be used in the present invention is not limited in particular. Specific examples of such polyols are low molecular weight polyols having less than 200 of number average molecular weight, such as polyether polyols, polyester polyols, polyester polycarbonate polyols and crystalline or noncrystalline polycarbonate polyols.

As described above, the polyols of the component (b) used in the present invention may be the phosphorus-containing polyol alone represented by the general formula (1), and may also contain any polyol other than that within the range of obtaining the effect of the present invention.

Examples of the low-molecular polyols are aliphatic diols such as ethylene glycol, 1,2-propanediol, 1,3-propanediol, 2-methyl-1,3-propanediol, diethyleneglycol, triethyleneglycol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol and 1,9-nonanediol; alicyclic diols such as cyclohexanedimethanol and cyclohexanediol; trivalent or more polyols such as trimethylol ethane, trimethylol propane, hexytols, pentitols, glycerin, polyglycerin, pentaerythritol, dipentaerythritol and tetramethylol propane.

Examples of the above polyether polyols are 1,2-propanediol, 1,3-propanediol; low-molecular polyols such as trimethylol propane, glycerin, polyglycerin and pentaerythritol; and further, bisphenol A, ethyleneoxide addition products and/or propyleneoxide addition products of amine compounds such as ethylenediamine; and polytetramethyleneetherglycol etc. It is preferable that the average molecular weight of polyether polyols used for the present invention is 300-5000, particularly 1000-3000 is better.

Examples of the above polyesterpolyols are products obtained by direct esterification reaction, and/or ester interchange reaction of the polyols such as low-molecular polyols cited before, with (1) an amount less than stoichiometric amount of polycarboxylic acids, or ester-forming derivatives such as esters thereof or anhydrides thereof, or carboxylic halides thereof, and/or (2) lactones, or hydroxycarboxylic acids obtained by a hydrolysis ring-opening reaction of the lactones.

Examples of the above polycarboxylic acid or its ester-forming derivatives are aliphatic dicarboxylic acids such as oxalic acid, malonic acid, succinic acid, glutaric acid, adipic acid, pimelic acid, suberic acid, azelaic acid, sebacic acid, dodecanedioic acid, 2-methyl succinic acid, 2-methyl adipic acid, 3-methyl adipic acid, 3-methyl pentanedioic acid, 2-methyl octanedioic acid, 3,8-dimethyldecanedioic acid, 3,7-dimethyldecanedioic acid, hydrogenerated dimer acid and dimer acid; aromatic dicarboxylic acids such as phthalic acid, terephthalic acid, isophthalic acid and naphthalenedicarboxylic acid; alicyclic dicarboxylic acids such as cyclohexanedicarboxylic acid; tricarboxylic acids such as trimellitic acid, trimesic acid and trimers of castor oil fatty acid; polycarboxylic acids such as tetracarboxylic acids like pyromeritic acids. Examples of ester-forming derivatives of these polycarboxylic acids are those anhydrides, carboxylic acid halides such as chloride and bromide of the said polycarboxylic acid, and lower fatty esters such as methylester, ethylester, propylester, isopropylester, butylester, isobutylester and amylester of the above polycarboxylic acids.

Examples of the above lactones are γ-caprolactone, δ-caprolactone, ε-caprolactone, dimethyl ε-caprolactone, δ-valerolactone, γ-valerolactone and γ-butyrolactone. It is preferable that the number average molecular weight of polyesterpolyols used for the present invention is 300 to 5000, and particularly 500 to 3000 is more preferable.

Examples of the above polyester polycarbonate polyol are a reaction product obtained by reacting polyester glycol such as polycaprolactone polyol with alkylene carbonate; and a reaction product obtained by reacting organic dicarboxylic acid with a reaction mixture obtained by reacting ethylene carbonate with polyalcohol.

Examples of crystalline or non-crystalline polycarbonate polyol are reaction products of diols such as 1,3-propanediol, 1,4-butanediol, 1,6-hexanediol, diethylene glycol, polyethylene glycol, polypropylene glycol and/or polytetramethylene glycol, with phosgene, diaryl carbonate (for example, diphenyl carbonate) or cyclic carbonate (for example, propylene carbonate).

The aqueous polyurethane resin composition of the present invention obtained by polymerization using the chain extending agent (f) may be a self-emulsification type polyurethane resin composition obtained by introducing the ionic group-introducing component (c) such as an anionic group or a cationic group, or a hydrophilic group such as a polyethylene glycol group in the polyurethane skeleton to disperse in water, or also may be a forced emulsification type polyurethane resin composition using an emulsification dispersing agent (e) such as a surfactant. Moreover, the aqueous polyurethane resin composition of the present invention may be a combination type composition obtained by combining self-emulsification and forced emulsification.

Components introducing an anionic group and components introducing a cationic group are cited as the ionic group-introducing component of the above component (c). Examples of components introducing the anionic group are polyols containing carboxyl groups such as dimethylol propionic acid, dimethylol butanoic acid, dimethylol butyric acid and dimethylol valeric acid, and polyols containing sulfonic acid groups such as 1,4-butanediol-2-sulfonic acid. Examples of components introducing the cationic group are N-alkyl-N, N-dialkanolamines such as N,N-dialkyl alkanolamines, N-methyl-N,N-diethanol amine and N-butyl-N,N-diethanol amine, and trialkanolamines.

The amount of the above ionic group-introducing component (c) used depends on the types of polyols and polyisocyanates used as well as the relations between the component (c) and emulsifying agents used. In the case where the self-emulsification type is used as the ionic group-introducing component (C), it is used so that it occupies 0.5 to 50 mass %, and preferably 1 to 30 mass %, in the whole reaction components, which are necessary to form aqueous polyurethane resin. When the amount used is less than 0.5 mass %, the storage stability of the aqueous polyurethane resin composition obtained is poor. When the using amount is more than 50 mass %, the water dispersing properties of urethane prepolymer and physical properties of urethane coating film may be negatively affected.

Among the aforementioned ionic group neutralizing agent components (d), examples of neutralizing agent for anionic group are trialkyl amines such as trimethyl amine, triethyl amine and tributyl amine; N,N-dialkylalkanolamines such as N,N-dimethylethanol amine, N,N-dimethylpropanol amine, N,N-dipropyl ethanol amine and 1-dimethylamino-2-methyl-2-propanol; tertiary amine compounds such as N-alkyl-N,N-dialkanol amines and triethanol amine; basic compounds such as ammonia, trimethyl ammonium hydroxide, sodium hydroxide, potassium/hydroxide and lithium hydroxide.

Examples of neutralizing agents for cationic group are organic carboxylic acids such as formic acid, acetic acid, lactic acid, succinic acid, glutaric acid and citric acid; organic sulfonic acids such as paratoluene sulfonic acid and alkyl sulfonate; inorganic acids such as hydrochloric acid, phosphoric acid, nitric acid and sulfonic acid; and an epoxy compound such as epihalohydrin; and also quaternized agents such as dialkyl sulfuric acid and alkyl halide.

When the excess or deficiency of the amount of these neutralizing agents used is great relative to 1 equivalent of ionic group, physical properties of coated film or the like obtained from the aqueous polyurethane resin composition, such as water resistance, strength and stretch, maybe deteriorated. Therefore, as for the amount of these neutralizing agents used, 0.5 to 2.0 equivalent is preferable, and 0.8 to 1.5 equivalent is more preferable relative to 1 equivalent of ionic group.

The aforementioned emulsifying agent component (e), which is not limited in particular, can be used as needed and also can be selected as appropriate from among common anionic or non-ionic surfactants, and cationic surfactants such as primary amine salt, secondary amine salt, tertiary amine salt, quaternary amine salt and pyridinium salt, and moreover amphoteric surfactants such as betaine type, sulfuric acid ester type and sulfonic acid type.

Examples of the above anionic surfactants are alkyl sulfates such as sodium dodecyl sulfate, potassium dodecyl sulfate and ammonium dodecyl sulfate; polyoxyethylene ether sulfates such as sodium dodecyl polyglycol ether sulfate and ammonium polyoxyethylene alkylether sulfate; sodium sulforicinoleate; alkyl sulfonates such as alkali metal salt of sulfonated paraffin and ammonium salt of sulfonated paraffin; fatty acid salts such as sodium laurate, triethanolamine oleate and triethanol amine abietate; alkylaryl sulfonates such as sodium benzene sulfonate and alkali phenol hydroxyethylene sulfonate of alkali metal; high-alkyl naphthalene sulfonic acid salt; a naphthalene sulfonic acid formalin condensate; dialkyl sulfosuccinate salt; polyoxyethylene alkyl sulfate salt; polyoxyethylene alkylaryl sulfate salt; polyoxyethylene ether phosphate salt; polyoxyethylene alkylether acetate salt; N-acylamino acid salt; and N-acylmethyl taurine salt.

Examples of the above non-ionic surfactants are fatty acid partial esters of polyalcohol such as sorbitan monolaurate and sorbitan monooleate; polyoxyethylene glycol fatty acid esters; polyglycerin fatty acid esters; ethylene oxide addition products and/or propylene oxide addition products of alcohol having 1 to 18 carbon atoms; ethylene oxide addition products and/or propylene oxide addition products of alkyl phenol; ethylene oxide addition products and/or propylene oxide addition products of alkylene glycol and/or alkylenediamine. Examples of alcohol having 1 to 18 carbon atoms resulting from these non-ionic surfactants are methanol, ethanol, propanol, 2-propanol, butanol, 2-butanol, tertiary butanol, amyl alcohol, isoamyl alcohol, tertiary amylalcohol, hexanol, octanol, decane alcohol, lauryl alcohol, myristyl alcohol, palmityl alcohol and stearyl alcohol.

Examples of the aforementioned alkyl phenol are phenol, methylphenol, 2,4-di-tert-butyl phenol, 2,5-di-tert-butylphenol, 3,5-di-tert-butylphenol, 4-(1,3-tetra-methylbutyl)phenol, 4-iso-octylphenol, 4-nonylphenol, 4-tert-octylphenol, 4-dodecylphenol, 2-(3,5-dimethylheptyl)phenol, 4-(3,5-dimethylheptyl)phenol, naphthol, bisphenol A and bisphenol F.

Examples of the aforementioned alkylene glycol are ethylene glycol, 1,2-propanediol, 1,3-propanediol, 2-methyl-1,3-propanediol, 2-butyl-2-ethyl-1,3-propanediol, 1,4-butanediol, neopentyl glycol, 1,5-pentanediol, 3-methyl-1,5-pentanediol, 2,4-diethyl-1,5-pentanediol and 1,6-hexanediol. Examples of the aforementioned alkylene diamine are products wherein the alcoholic hydroxyl group of the above alkylene glycol is substituted with the amino group. In addition, ethylene oxide addition products and propylene oxide addition products may be random addition products or block addition products.

Examples of the aforementioned cationic surfactants are lauryl trimethyl ammonium chloride, stearyl trimethyl ammonium chloride, distearyl dimethyl ammonium chloride, didecyl dimethyl ammonium chloride, lauryl benzyl dimethyl ammonium chloride, didecyl dimethyl ammonium chloride, alkyl pyridinium bromide and imidazolinium laurate.

Examples of the aforementioned ampholytic surfactants are betaine type metal salts of coconut oil fatty acid amide propyl dimethyl aminoacetic acid betaine, lauryl dimethyl aminoacetic acid betaine, 2-alkyl-N-carboxymethyl-N-hydroxyethyl imidazolinium betaine, lauryl hydroxy sulfobetaine and lauroyl amide ethylhydroxyethyl carboxymethylbetaine hydroxypropyl phosphoric acid; amino acid type such as β-lauryl aminopropionic acid metal salts; sulfuric acid ester type and sulfonic acid type.

The amount of the emulsifying agent component (e) used, which is used as needed, is not limited in particular. However, from the viewpoints of physical properties of coated film obtained by coating the aqueous polyurethane resin composition, such as water resistance, strength and stretch, it is preferable to use 1 to 30 mass parts, in particular 5 to 20 mass parts of the emulsifying agent component (e), relative to 100 mass parts of polyurethane resin. If the amount used is less than 1 mass part, sufficient dispersing properties may not be obtained. If it is more than 30 mass parts, the physical properties of the coated film may be deteriorated.

The aforementioned chain-extending agent component (f) can be selected as appropriate from among commonly-used chain-extending agents such as low molecular weight polyol compounds and low molecular weight polyamine compounds having less than 200 of number average molecular weight. Examples of such chain-extending agent components are, the above low molecular weight diols, low molecular weight diamines such as ethylene diamine, propylene diamine, hexamethylene diamine, trilene diamine, piperazine and 2-methylpiperazine; polyether diamines such as polyoxypropylene diamine and polyoxyethylene diamine; aminoalcohols such as monoethanolamine, diethanolamine, monopropanolamine, dipropanolamine, N-(2-hydroxy propyl)aminomethanol, 2-(hydroxy methylamino)ethanol and 2-(2-aminoethylamino)ethanol; alicyclic diamines such as methane diamine, isophorone diamine, norbornene diamine, bis (4-amino-3-methyldicyclohexyl)methane, diamino dicyclohexyl methane, bis(aminomethyl)cyclohexane and 3,9-bis(3-aminopropyl)-2,4,8,10-tetraoxaspino(5,5)undecane; polyamines of aromatic diamines such as m-xylene diamine, α-(m-/p-aminophenyl)ethyl amine, m-phenylene diamine, diaminodiphenyl methane, diaminodiphenyl sulfone, diaminodiethyldimethyldiphenyl methane, diaminodiethyldiphenyl methane, dimethylthiotoluene diamine, diethyltoluene diamine and α,α'-bis(4-aminophenyl)-P-diisopropylbenzene; hydrazines such as succinic acid dihydrazide, adipic acid dihydrazide, sebacic aid dihydrazide, phtalic acid dihydrazide, hydration hydrazine, 1,6-hexamethylenebis(N,N-dimethyl semicarbazide) and 1,1,1',1'-tetramethyl-4,4'-(methylene-di-para-phenylene)disemicarbazide, and water.

As for the amount of these chain-extending agents used, from the viewpoint of coated film physical properties or the like, of urethane resin, it is preferable that the amino group of the chain-extending agent is within the range of 0.1 to 1.0 equivalent relative to 1 equivalent of isocyanate group which is contained in the urethane prepolymer before the chain-extending reaction.

In addition, an inactive solvent to reaction can be used if needed in the manufacture of aqueous polyurethane resin composition for flame retardant coated material in the present invention. Examples of these solvents are acetone, methylethyl ketone, dioxane, tetrahydrofurane and N-methyl-2-pyrolidone. Generally, 3 to 100 mass percents of these solvents are used relative to the total amount of the above raw materials used for manufacturing prepolymers. In the present invention, it is preferable that the solvents having 100° C. or less boiling point, among these solvents, are distilled away under reduced pressure after water-dispersing the urethane polymer.

Additionally, in the present invention, it is preferable that the NCO number/OH number which is a ratio of numbers of the isocyanate group of the polyisocyanate component (a) used and numbers of alcoholic hydroxyl group of the polyol component (b) used is 1.0 to 5.0, and the range of 1.05 to 3.0 is more preferable. It is preferable that the urethane prepolymer comprised of the components (a) and (b) has an isocyanate group at the terminal in order to react with the ionic group-introducing component (c) which is used as needed. Accordingly, when the NCO number/OH number is less than 1.0, the urethane prepolymer has a hydroxyl group at the terminal, which is not preferable. Furthermore, when the NCO number/OH number is more than 5.0, the storage stability of the aqueous polyurethane resin composition obtained may decline, which is also not preferable.

The aqueous polyurethane resin composition for flame retardant coated material of the present invention contains 30 to 900 mass parts of water, preferably 80 to 400 mass parts of water, relative to 100 mass parts of the urethane resin obtained as a result of the chain-extension of the urethane prepolymer. When the blending amount of water against the urethane resin is less than 30 mass parts, the viscosity is so high that the treatment becomes difficult. When it is more than 900 mass parts, the physical properties of coated film decline since the curing properties of the coated film prepared by coating the coating composition decline.

The blending ratio of the polyisocyanate component (a) against whole amount of polyol component (b) and ionic group-introducing component (c), in the manufacture of aqueous polyurethane resin composition for flame retardant coated materials of the present invention, is not limited in particular. However, at the stage of reacting the components (a), (b) and (c), it is preferable that the isocyanate group equivalent of the component (a) is 0.5 to 5 relative to 1 equivalent of the group which reacts with isocyanate group, such as a hydroxyl group contained in the components (b) and (c), and 0.9 to 3.0 is more preferable. The optimum is 1 to 2.0 in particular.

When the aqueous polyurethane resin composition for a flame retardant coated materials of the present invention is used for paints or coating agents, those which impart especially strong adhesiveness to the base material, such as a silane coupling agent, colloidal silica, tetra-alkoxy silane or condensation polymerization products thereof, a chelate agent and an epoxy compound, may be used.

The aqueous polyurethane resin composition for flame retardant coated materials of the present invention can be used not only as a one liquid type but also as a two liquids type by using a curing agent. In addition, if necessary, various types of commonly used and widely-known additive agents may be used. Examples of the said additive agents are a light stabilizer, an antioxidant, an ultraviolet absorber, a pigment, a dye compound, a tarnish auxiliary agent, a curing agent, a blocking inhibitor, a leveling agent, an antigelling agent, a dispersion stabilizer, a radical scavenger, a heat resistance-imparting agent, an organic and inorganic filler, a plasticizer, a lubricant, an antistatic agent, a reinforcing agent, a catalyst, a thixotropy agent, an antibacterial agent, a mildew-proofing agent, an anticorrosion agent, an antifoaming agent, a non-associated form thickening agent, an organic solvent, a surface conditioner and an anti-settling agent.

When the aqueous polyurethane resin composition for flame retardant coated materials of the present invention is used for coated film and paint, it is preferable to use a hindered amine light stabilizer, an ultraviolet absorber and an antioxidant agent (a phosphorus, phenol or sulfur antioxidant agent) among the above various additive agents.

Examples of the above hindered amine light stabilizer are 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidylmethylmethacrylate, 2,2,6,6-tetramethyl-4-piperidylmethylmethacrylate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane-tetracarboxylate, bis(2,2,6,6-tetramethyl-4-piperidyl)•bis(tridecyl)-1,2,3,4-butanetetracarboxylate, bis(1,2,2,6,6-pentamethyl-4-piperidyl)•bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidynol/diethyl succinate condensation polymerization products, 1,6-bis(2,2,6,6-tetramethyl-4-piperidylamino)hexane/dibromo ethane condensation polymerization products, 1,6-bis(2,2,6,6-tetramethyl-4-piperidylamino)hexane/2,4-dichloro-6-morpholino-s-triazine condensation polymerization products, 1,6-bis(2,2,6,6-tetramethyl-4-piperidylamino) hexane/2,4-dichloro-6-tert-octylamino-s-triazine condensation polymerization products, 1,5,8,12-tetrakis[2,4-bis(N-butyl-N-(2,2,6,6-tetramethyl-4-piperidyl)amino)-s-triazine-6-yl]-1,5,8,12-tetra-azadodecane, 1,5,8,12-tetrakis [2,4-bis(N-butyl-N-(1,2,2,6,6-pentamethyl-4-piperidyl) amino)-s-triazine-6-yl]-1,5,8,12-tetra-azadodecane, 1,6,11-tris[2,4-bis(N-butyl-N-(2,2,6,6-tetramethyl-4-piperidyl) amino)-s-triazine-6-ylamino]undecane, 1,6,11-tris[2,4-bis(N-butyl-N-(1,2,2,6,6-pentamethyl-4-piperidyl)amino)-s-triazine-6-ylamino]undecane, 3,9-bis[1,1-dimethyl-2-[tris (2,2,6,6-tetramethyl-4-piperidyloxycarbonyloxy) butylcarbonyloxy]ethyl]-2,4,8,10-tetraoxaspiro[5,5] undecane, 3,9-bis[1,1-dimethyl-2-[tris(1,2,2,6,6-pentamethyl-4-piperidyloxycarbonyloxy)butylcarbonyloxy] ethyl]-2,4,8,10-tetraoxaspiro[5,5]undecane.

Examples of the above ultraviolet absorber are 2-hydroxybenzophenones such as 2,4-dihydroxybenzophenone, 2-hydroxy-4-methoxybenzophenone, 2-hydroxy-4-octoxybenzophenone, 5,5'-methylenebis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5- chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), polyethylene glycolester of 2-(2-hydroxy-3-tert-butyl-5-carboxyphenyl)benzotriazole, 2-[2-hydroxy-3-(2-acryloyloxyethyl)-5-methylphenyl] benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzo triazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl] benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-$C_{12}$-$C_{13}$ mixed alkoxy-2-hydroxypropoxy)phenyl]-4,6-bis(2,4-dimethylphenyl)-1,3,5-triazine, 2-[2-hydroxy-4-(2-acryloyloxyetoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate and behenyl(3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl)acrylate; various kinds of metal salts or metal chelates, in particular nickel or chromium salts or chelates.

Examples of the above phosphorus antioxidant are triphenylphosphite, tris(2,4-di-tert-butylphenyl)phosphite, tris(2,5-di-tert-butylphenyl)phosphite, tris(nonylphenyl)phosphite, tris(dinonylphenyl)phosphite, tris(mixed nonylphenyl consisting of mononylphenyl and dinonylphenyl)phosphite, diphenyl acid phosphite, 2,2'-methylenebis(4,6-di-tert-butylphenyl)octylphosphite, diphenyldecylphosphite, diphenyloctylphosphite, di(nonylphenyl)pentaerythritol diphosphite, phenyldiisodecylphosphite, tributylphosphite, tris(2-ethylhexyl)phosphite, tridecylphosphite, trilaurylphosphite, dibutyl acid phosphite, dilauryl acid phosphite, trilauryltrithiophosphite, bis(neopentylglycol)•1,4-cyclohexane dimethyldiphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearylpentaerythritol diphosphite, tetra($C_{12-15}$ mixed alkyl)-4,4'-isopropylidenediphenylphosphite, bis[2,2'-methylenebis(4,6-diamylphenyl)]•isopropylidenediphenylphosphite, tetratridecyl•4,4'-butylidenebis(2-tert-butyl-5-methylphenol)diphosphite, hexa(tridecyl)•1,1,3-tris(2-methyl-5-tert-butyl-4-hydroxyphenyl)butane•triphosphite, tetrakis(2,4-di-tert-butylphenyl)biphenylenediphosphonite, tris(2-[(2,4,7,9-tetrakis-tert-butyldibenzo[d,f][1,3,2]dioxaphosphepin-6-yl)oxy]ethyl)amine, 9,10-dihydro-9-oxa-10-phosphaphenanthrene-10-oxide, tris(2-[(2,4,8,10-tetrakis-tert-butyldibenzo[d,f][1,3,2]dioxaphosphepin-6-yl)oxy]ethyl)amine, 2-(1,1-dimethylethyl)-6-methyl-4-[3-[[2,4,8,10-tetrakis(1,1-dimethylethyl)dibenzo[d,f][1,3,2]dioxaphosphepin-6-yl]oxy]propyl]phenol and 2-butyl-2-ethylpropanediol•2,4,6-tri-tert-butylphenol monophosphite.

The above phenol antioxidants are, for example, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl•3,5-di-tert-butyl-4-hydroxybenzyl thioacetate, thiodiethylenebis[(3,5-di-tert-butyl-4-hydoxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5,5]undecane, triethyleneglycolbis[β-(3-tert-butyl-4-hydroxy-5-methylphenyl)propionate], and tocophenol.

The aforementioned sulfuric antioxidants are, for example, dialkylthiodipropionates such as thiodipropionic acid esters with dilauryl, dimyristyl, myristylstearyl or distearyl; and β-alkylmercapto propionic acid esters of polyol such as pentaerythritol tetra(β-dodecylmercaptopropionate).

It is preferable that each amount of the above hindered amine light stabilizer, ultraviolet absorber and antioxidant used is 0.001-10 mass parts relative to 100 mass parts of aqueous polyurethane resin composition of the present invention in solid content and 0.01-5 mass parts is more preferable in particular. If it is less than 0.001 mass parts, sufficient addition effect may not be obtained. If it is more than 10 mass parts, dispersing properties and physical properties of coating may be negatively affected. Furthermore, addition methods of these hindered amine light stabilizer, ultraviolet absorber and antioxidant may be any of methods of adding to polyol component, adding to prepolymer and adding to aqueous phase at the time or after the time of water dispersion. However, the methods of adding to polyol component and adding to prepolymer are preferable from the viewpoint of ease of treatment.

In addition, other phosphorous flame retardants and inorganic flame retardants other than the phosphorus-containing polyol represented by the general formula (1) may further be added to the aqueous polyurethane resin composition for flame retardant coated materials of the present invention.

Examples of the above other phosphorus flame retardants are polyphosphate salt flame retardants such as ammonium polyphosphate; phosphoric ester flame retardants such as triphenyl phosphate, tricresyl phosphate, trixylenyl phosphate, cresyl diphenyl phosphate, trimethyl phosphate, triethyl phosphate, tributyl phosphate, trioctyl phosphate, tributoxy ethyl phosphate, octyl diphenyl phosphate, di-(polyoxyethylene)-hydroxy methyl phosphonate, diethyl phenyl phosphonate, dimethyl phenyl phosphonate, diethoxy-bis-(2-hydroxy ethyl)-aminomethyl phosphonate, resorcinol diphenyl phosphate and bisphenol A diphenyl phosphate; a reactive phosphorus flame retardant such as diethyl-N,N-bis(2-hydroxyethyl)aminomethyl phosphonate; an inorganic phosphate flame retardant such as titanium phosphate; a red phosphorus flame retardant such as red phosphorus; and phenyl phosphoric acid, and flame retardants wherein these phosphorus flame retardants are modified to water type.

Examples of the above inorganic flame retardants are antimony compounds such as antimony trioxide, antimony pentoxide and antimony-silicooxide; metallic hydroxides such as magnesium hydroxide and aluminum hydroxide; a hydrated metallic compound; tin compounds such as tin oxide, tin hydroxide and zinc stannate; zirconium compounds such as zirconium oxide and zirconium hydroxide; boric-acid compounds such as zinc borate and barium metaborate; guanidine compounds such as guanidine phosphate and nitrided guanidine; a molybdenum compound such as molybdenum trioxide; silicone compounds such as silicone resin and silicone oil; a triazine compound such as organic triazine, and flame retardants wherein these inorganic flame retardants are modified to water type.

Usage examples of the aqueous polyurethane resin composition for flame retardant coating materials of the present invention are a coating agent, an adhesive agent, a surface modifier and binders for organic and/or inorganic powder. Specific examples of materials to be coated are wood materials such as plywood, bonded wood and single layer laminated wood, and building materials to be coated like materials for inorganic constructional materials such as floors, walls, ceilings, interior tiles, bricks and concrete; civil engineering materials such as road pavement, waterproof•repair•reinforcement and corrosion proof of base, joint and steel parts of bridges; automobile materials such as interior parts, exterior parts, engine parts and brake parts of automobiles; railroad vehicle materials such as roofs, airways, decorative laminates, insulating materials, windows, floors and doors; materials for air and space used mainly for structural materials such as aluminum alloy, titanium alloy and FRP; electrical and electronic materials such as semiconductors, batteries, cable materials, magnetic discs and tapes, compact motors, piezoelectric elements, conductive materials, sensors, photosensitive materials, terminal-oriented materials (telephone equipments and facsimiles) and copper-covered laminated plate materials; communication device materials used mainly for optical parts such as optical fibers; precision equipments•OA equipments used for cameras, watches, measurement equipments and copy machines; sporting goods materials such as skiing, archery, golf and tennis; fiber materials such as architectural curing nets, meshes, sheets and tents, hanging curtains, curtains, table-cloths and gloves; fiber-implanting materials such as foot wear materials like uppers, soles, core materials, heels, top lifts and insoles of shoes and binders for implant process; wrapping materials using paper, plastic, aluminum foil or the like as a substrate film; bookbinding materials such as cover sheets, end papers and backs; musical instrument materials such as pianos, electronic organs and electronic musical instruments; furniture materials such as drawers, shelves, desks, chairs and sofas; medical materials used for the area of artificial joints, artificial bones, artificial blood vessels, bond and suturation of skin, and dental orthodontics and used for dental prosthesis.dental restoration; and other glass fiber-converging agents and coating agents for agricultural film.

Additionally, the aqueous polyurethane resin composition for flame retardant coated materials of the present invention, which has an excellent compatibility with other aqueous resin emulsions such as synthetic resin emulsions like, polyvinyl acetate, ethylene-vinyl acetate copolymer and acrylic resin, and rubber latexes such as natural rubber, SPR and NBR, is also useful as a modifying agent for them.

The materials for base substances coated with the aqueous polyurethane resin for flame retardant coated materials are not limited in particular. Any of plastic, metal, paper, wood, fiber, glass, rubber, ceramic and concrete may be fine. In terms of shape, various shaped products such as film-like, sheet-like, plate-like and fiber-like are cited, and there is no limitation in particular.

Examples of the above plastics are thermoplastic resins such as acetal resin, acrylic resin, methyl methacrylate resin, acetylcellulose, cellulose nitrate, ethylene.acrylic copolymer, fluorocarbon resin, polyacrylonitrile, polyamide like nylons, polybutadiene•acrylonitrile copolymer, polybutadiene•styrene copolymer, polycarbonate, polyethylene, saturated polyester like polyethylene terephthalates, polyhydroxy ether, polyimide, polyphenylene oxide, polypropylene, polystyrene and copolymer thereof, polysulfone, polyvinyl acetate, ethylene•vinyl acetate copolymer, polyvinyl alcohol, polyvinyl alkylether, polyvinyl butyral, polyvinyl chloride, polyvinyl methylether and polyurethane; thermosetting resins obtained from alkyd, casein, cyanoacrylate, diallyl phthalate, epoxy and modified products thereof, furane, melamine formaldehyde, phenol formaldehyde, phenol•furfural, resorcinol•phenol formaldehyde, silicone, urea-formaldehyde, and thermosetting resins such as unsaturated polyester and polysulfide; and alloys such as epoxy-novolac, epoxy-phenolic, epoxy-polysulfide, epoxy-silicone, phenolic-butyral, phenolic-nitrile, phenolic-polyamide, polyamide-epoxy, polyimide-epoxy, silicone-vinyl phenolic, silicone-phenolic, vinyl formal-phenolic and vinyl butyral-phenolic.

Examples of the aforementioned metal are iron, carbon steel, cast iron, zinc plated sheet steel, alloy plated sheet steels plated with an alloy such as Zn—Fe system and Zn—Ni system; organic composite plated sheet steel, stainless steel, aluminum and alloys thereof, copper and alloys thereof, titanium and alloys thereof.

Examples of the aforementioned paper are glassine paper, woodfree paper, kraft paper, newsprint paper, impregnating paper, thin paper, simili paper, paperboard and tissue paper.

Examples of tree species of the aforementioned wood are coniferous wood such as a fir, a sakhalin fir, a geitch's silver fir, a *Chamaecyparis taiwanensis*, a cypress, a sawara cypress, a cedar, a larch, a Japanese spruce, a spruce, a Japanese red pine, a Japanese white pine, a Japanese black pine, a cypress and a Japanese hemlock; hardwood such as a acer pictum, a buckeye, Japanese cherry birch, *betula maximowicziana*, Japanese judas tree, a camphor tree, *distrlium recemosum*, a Japanese beech, a manchurian walnut, *machilus thungergii*, a magnolia, populus suaveolens, a Japanese linden, a Japanese ash, kalopanax, a paulowpia, mongolian oak, an Japanese elm, a zelkova and a red oak; Philippine lumbers such as a red lauan and a white lauan.

Examples of the aforementioned fiber are cellulosic recycled fibers such as rayon and cupra; semisynthetic fibers such as cellulosic acetate and proteinaceous promix (promix of the protein system); synthetic fibers such as polyamide type like nylon, polyvinyl alcohol type, polyvinylidene chloride type, polyvinyl chloride type, polyester type, polyacrylonitrile type, polyethylene type, polypropylene type, polyurethane type, polyalkylene p-oxybenzoate type and phenol type; inorganic fibers such as glass fiber and carbon fiber; plant fibers such as cotton, flax, ramie and jute; animal fibers such as wool and silk; and a mineral fiber such as asbestos.

Examples of the aforementioned glass are borosilicate glass, lead glass, soda lime glass, zinc glass and quartz glass.

Examples of the aforementioned rubber are silicone rubber, butyl rubber, ethylene-propylene terpolymer, natural rubber, butadiene rubber, styrene butadiene rubber, chloroprene rubber, nitrile rubber, polysulfide rubber, epichlorohydrin rubber, acrylic rubber and urethane rubber.

Examples of the aforementioned ceramic are alumina, steatite, forsterite, zircon, beryllia, zirconia, silicon nitride, aluminum nitride and silicon carbide.

Examples of the aforementioned concrete are ordinary concrete, light weight concrete, heavy weight concrete, crushed-stone concrete, AE concrete, water tight concrete, cement mortar, light weight aerated concrete, carbon fiber reinforced concrete and glass fiber reinforced concrete.

Among the above base substances, the fiber is suitable for coating the aqueous polyurethane resin composition for flame retardant coated materials of the present invention, and in particular polyester fiber, nylon fiber and cotton fiber or the like are preferable. The performances such as flame retardancy, abrasion resistance, flexibility, water resistance and durability can be imparted by coating these fibers with the aqueous polyurethane resin composition for flame retardant coated materials of the present invention. Especially, the applications to fiber products requiring the flame retardancy such as architectural curing nets, meshes, sheets, tents, hanging curtains and curtains is preferable.

The solid content concentration of the aqueous polyurethane resin composition for flame retardant coated materials of the present invention, which is not limited in particular, is preferably 30 to 70 mass percent, in particular 35 to 60 mass percent, from the viewpoint of work abilities such as easy retention of viscosity range, shortening of drying time and ease of thick film coating as described hereafter.

When the aqueous polyurethane resin composition for flame retardant coated materials of the present invention is used as a coating material, it can be coated as appropriate by publicly known methods such as immersion coating, brush coating, roller coating, spray coating, gravure coating, reverse roll coating, air knife coating, bar-coating, curtain roll coating, dip coating, rod coating and doctor blade coating.

The methods for coating the aqueous polyurethane resin composition for flame retardant coated materials of the present invention are not limited in particular. For example, by using a blade coater, an air knife coater, a rod coater, a hydro bar coater, a transfer roll coater, a reverse coater, a gravure coater, a dye coater, a curtain coater, a spray coater, a flow coater, a roll coater and a brush, coating can be carried out on the base substances partly or wholly. The drying temperature for film forming, after coating the aqueous polyurethane resin composition for flame retardant coated materials of the present invention, may be room temperatures or heating may be carried out at 50 to 200° C. for 5 to 600 seconds.

In addition, it is possible to use the methods wherein a film formed from the aqueous polyurethane resin composition for flame retardant coated materials of the present invention is laminated with other films, or thermal gluing or high-frequency gluing is carried out between the films formed from the present invention, or it is also possible to form a multilayered film using the film formed from the present invention together with film of other materials. Furthermore, it is possible to coat the base substance with the aqueous polyurethane resin composition for flame retardant coated materials of the present invention on the base substance in order to use it as a base material having aesthetic properties and a nonslip effect.

Hereafter, this invention will now be described in more detail referring to examples, but the invention is not limited in any way thereby. Also, unless otherwise specified, "%" refers to "mass percent".

EXAMPLE 1

81 g of ADEKA POLYOL FB-330 (The compound having the general formula (1), wherein $R^1$ is a propylene group, n=2-3, m=1, the hydroxyl value is 335 and phosphorus content is 7.5%.) as the phosphorus-containing polyol, 57 g of polyester polyol (1,6-hexanediol+adipic acid/isophthalic acid; commercial name of ADEKA NEW ACE YG-108 (the hydroxyl value is 120) manufactured by ADEKA CORPORATION) as (b) polyol, 4 g of trimethylol propane, 19 g of dimethylol propionic acid as the component (c), 142 g of dicyclo hexyl methane-4,4'-diisocyanate (hereafter, expressed as hydrogenerated MDI) as polyisocyanate of the component (a) and 115 g of N-methyl-2-pyrolidone (hereafter, expressed as NMP) as a solvent were mixed, and were reacted at 100° C. for 3 hours to obtain urethane prepolymer wherein the content of isocyanate was 1.5%.

The urethane prepolymer obtained was cooled down, then was mixed with 14 g of triethyl amine as a neutralizing agent of the component (d), next was introduced into 560 g of water prepared in advance little by little and was mixed further with water. After that, 4 g of ethylenediamine as a chain extending agent of the component (f) and water were introduced together, then were mixed at 25° C. until the isocyanate group disappeared by the measurement using the infrared spectrophotometer (hereafter, expressed as IR) to obtain anionic type aqueous polyurethane resin having 30% of solid content, 100 mPa·s of viscosity/25° C., pH=7 and 2% of phosphorus content in resin.

EXAMPLE 2

87 g of the ADEKA POLYOL FB-330 as the phosphorus-containing polyol, 43 g of polyester polyol (methyl pentanediol+adipic acid: commercial name is Kurapol P-510 (the hydroxyl value is 224) manufactured by Kuraray Co., Ltd.), 65 g of diol containing a polyoxyethylene group as the component (c) (commercial name is YMER-N120: the hydroxyl value is 113, manufactured by Perstorp CO., LTD), 113 g of hydrogenated MDI as the polyisocyanate of the component (a) and 80 g of NMP as a solvent were mixed, and were reacted at 100° C. for 3 hours to obtain urethane prepolymer wherein the content of isocyanate was 1.0%

The obtained urethane prepolymer was cooled down, and then was introduced little by little into 610 g of the water prepared in advance to mix with. And also 2 g of dietylene triamine as a chain extending agent of the component (f) was introduced together with water, then were mixed at 25° C. until the isocyanate group disappeared by the measurement of IR to obtain a non-ionic aqueous polyurethane resin having 30% of solid content, 200 mPa·s of viscosity/25° C., pH=6 and 2% of phosphorus content in resin.

EXAMPLE 3

80 g of the ADEKA POLYOL FB-330 as the phosphorus-containing polyol, 56 g of the ADEKA NEW ACE YG-108 as the polyol of the component (b), 23 g of N-methyl diethanol amine as the component (c), 145 g of hydrogenated MDI as polyisocyanate of the component (a) and 113 g of NMP as a solvent were mixed, and were reacted at 100° C. for 3 hours to obtain urethane prepolymer wherein the content of isocyanate was 1.5%.

After the obtained urethane prepolymer was cooled down, it was mixed with 40 g of dimethylsulfuric acid of the component (d), and then was introduced little by little into 530 g of the water prepared in advance to mix with. And also 3.5 g of ethylene diamine as a chain extending agent of the component (f) was introduced together with water, then were mixed at 25° C. until the isocyanate group disappeared by the measurement of IR to obtain a cationic aqueous urethane resin having 30% of solid content, 150 mPa·s of viscosity/25° C., pH=5 and 2% of phosphorus content in resin.

EXAMPLE 4

127 g of the ADEKA POLYOL FB-330 as the phosphorus-containing polyol, 8 g of the ADEKA NEW ACE YG-108 as the polyol of the component (b), 17 g of dimethylol propionic acid as the component (c), 152 g of hydrogenated MDI as polyisocyanate of the component (a) and 118 g of NMP as a solvent were mixed, and were reacted at 100° C. for 3 hours to obtain urethane prepolymer wherein the content of isocyanate was 1.5%.

The obtained urethane prepolymer was cooled down, and was mixed with 13 g of triethyl amine of the component (e), then was introduced little by little into 550 g of the water prepared in advance to mix with. And also 4 g of ethylene diamine as a chain extending agent of the component (f) was introduced together with water, then were mixed at 25° C. until the isocyanate group disappeared by the measurement of IR to obtain an anionic aqueous polyurethane resin having 30% of solid content, 200 mPa·s of viscosity/25° C., pH=7 and 3% of phosphorus content in resin.

EXAMPLE 5

87 g of the ADEKA POLYOL FB-330 as the phosphorus-containing polyol, 43 g of the Kurapol P-510 as polyol of the component (b), 65 g of the above YMER-N120 as the component (c), 113 g of hydrogenated MPI as polyisocyanate of the component (a) and 80 g of NMP as a solvent were mixed, and were reacted at 100° C. for 3 hours to obtain urethane prepolymer wherein the content of isocyanate was 1.0%.

The obtained urethane prepolymer was cooled down, and then 43 g of bisphenol A bisdiphenyl phosphate (Commercial name is ADEKA STAB FP-600 manufactured by ADEKA CORPORATION: phosphorus content is 8.9%) was added and mixed as an other flame retardant. After being uniformed, it was introduced little by little into 630 g of the water prepared in advance to mix with. And also 1.5 g of diethylene triamine as a chain extending agent of the component (f) was introduced together with water, then were mixed at 25° C. until the isocyanate group disappeared by the measurement of IR to obtain a non-ionic aqueous polyurethane resin having 30% of solid content, 150 mPa·s of viscosity/25° C., pH=6, and 3% of phosphorus content in resin.

COMPARATIVE EXAMPLE 1

150 g of the above ADEKA NEW ACE YG-108 as the polyol of the component (b), 4 g of trimethylol propane, 17 g of dimethylol propionic acid of the component (c), 131 g of hydrogenated MDI as the polyisocyanate of the component (a) and 105 g of NMP as a solvent were mixed, and were reacted at 100° C. for 3 hours to obtain urethane prepolymer wherein the content of isocyanate was 3.5%.

The obtained urethane prepolymer was cooled down, and was mixed with 13 g of triethyl amine as the component (e), then was introduced little by little into 540 g of the water prepared in advance to mix with. And also 10 g of ethylene diamine as a chain extending agent of the component (f) was introduced together with water, then were mixed at 25° C. until the isocyanate group disappeared by the measurement of IR to obtain an anionic aqueous polyurethane resin having 30% of solid content, 50 mPa·s of viscosity/25° C. and pH=8.

COMPARATIVE EXAMPLE 2

128 g of the KURAPOL P-510 as the component (b), 64 g of the YMER-N120 as the component (c), 111 g of hydrogenated MDI as the polyisocyanate of the component (a) and 77 g of NMP as a solvent were mixed, and were reacted at 100° C. for 3 hours to obtain urethane prepolymer wherein the content of isocyanate was 2.5%.

The obtained urethane prepolymer was cooled down, and then was introduced little by little into 600 g of the water prepared in advance to mix with. And also 6.5 g of diethylene triamine as a chain extending agent of the component (f) was introduced together with water, then were mixed at 25° C. until the isocyanate group disappeared by the measurement of IR to obtain a non-ionic aqueous polyurethane resin having 30% of solid content, 100 mPa·s of viscosity/25° C. and pH=7.

COMPARATIVE EXAMPLE 3

138 g of the above ADEKA NEW ACE YG-108 as the polyol of the component (b), 27 g of N-methyl diethanol amine of the component (c), 138 g of hydrogenated MDI as the polyisocyanate of the component (a) and 110 g of NMP as a solvent were mixed, and were reacted at 100° C. for 3 hours to obtain urethane prepolymer wherein the content of isocyanate was 3.5%.

The obtained urethane prepolymer was cooled down, and was mixed with 48 g of dimethyl sulfuric acid of the component (e). Then the obtained mixture was introduced little by little into 510 g of the water prepared in advance to mix with. And also 9 g of ethylene diamine as a chain extending agent of the component (f) was introduced together with water, and were mixed at 25° C. until the isocyanate group disappeared by the measurement of IR to obtain a cationic aqueous polyurethane resin having 30% of solid content, 100 mPa·s of viscosity/25° C. and pH=5.

COMPARATIVE EXAMPLE 4

An attempt to add 40 g of the ADEKA STAB FP-600 to the aqueous polyurethane resin obtained in the above Comparative example 1 was carried out. However, the aqueous polyurethane resin having excellent dispersing properties could not be obtained.

COMPARATIVE EXAMPLE 5

57 g of triethyl phosphate was added to the aqueous polyurethane resin obtained in the above Comparative example 1 and the aqueous polyurethane resin having 30% of solid content, 100 mPa·s of viscosity/25° C. and pH=7 was obtained as the phosphoester compound after added polyurethane resin.

COMPARATIVE EXAMPLE 6

Except that the following compound No. 1 (phosphorus content is 12%) was used so as to equal the phosphorus content instead of the ADEKA POLYOL FB-330 used as the phosphorus-containing polyol in the above Example 1, the aqueous polyurethane resin having 30% of solid content, 100 mPa·s of viscosity/25° C. and pH=7 was obtained in the same manner as Example 1.

Compound No. 1

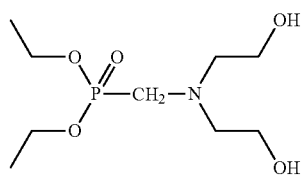

No. 1

[Evaluation]

With respect to the aqueous polyurethane resin obtained in the above Examples and Comparative examples, the hydrolysis resistance, the bleeding properties (tackiness) of the coated film surface and the flame retardancy of the coated film were evaluated as described below.

[Evaluation of Hydrolysis Resistance]

The aqueous polyurethane resins obtained in the above Examples of 1-5 and Comparative example 5 were put in the 250 ml airtight containers, respectively, and were left as they were for two weeks under the atmosphere of 40° C., in order to compare the physical properties (stretch and strength) of coated films obtained by using the polyurethane resins of before and after the test. The results were shown in Table 1. In this regard, in case of Comparative example 5, the coated film was not formed after the test so that the evaluation of physical properties could not be carried out.

[Evaluation of Bleeding Properties (Tackiness) of Coated Film Surface]

The coated films (100 μm thick) were manufactured by using the aqueous polyurethane resins obtained in the above Examples of 1-5 and Comparative example 5, respectively, and were left as they were for one month under the atmosphere of 20° C., in order to evaluate the bleeding properties (tackiness) of each coated film surface by fingering. The results were shown in Table 1.

(Evaluation Standards)

No bleeding was found on the coated film surface: ○
Slight bleeding was found on the coated film surface: Δ
Bleeding was found on the coated film surface: X

TABLE 1

|  |  |  | Examples | | | | | Comparative example |
|---|---|---|---|---|---|---|---|---|
|  |  |  | 1 | 2 | 3 | 4 | 5 | 5 |
| Hydrolysis resistance test | Before the test | Stretch (%) | 208 | 550 | 300 | — | 485 | 265 |
|  |  | Strength (MPa) | 28 | 2.6 | 20 | 50 | 4.0 | 55 |
|  | After the test | Stretch (%) | 190 | 500 | 320 | — | 420 | 240 |
|  |  | Strength (MPa) | 35 | 3.2 | 24 | 56 | 6.2 | 50 |
| Bleeding properties of coated film surface | | | ○ | ○ | ○ | ○ | ○ | x |

[Evaluation of Flame Retardancy of Coated Film]

The coated films (10 μm thick) were manufactured by using the aqueous polyurethane resins obtained in the above Examples from 1 to 5, Comparative examples from 1 to 3, 5 and 6, and the measurements were carried out according to the UL94VTM ("Vertical flame test of thin materials: ASTM D4804").

The results were shown in Table 2.

TABLE 2

|  |  | Examples | | | | | Comparative examples | | | |
|---|---|---|---|---|---|---|---|---|---|---|
|  |  | 1 | 2 | 3 | 4 | 5 | 1 | 2 | 3 | 5 | 6 |
| Flame retardancy test | Burning time (sec)[1] | 1≥ | 1≥ | 1≥ | 1≥ | 1≥ | (Burned out) | | | 1≥ | 25 |
|  | Evaluation | VTM-0 | VTM-0 | VTM-0 | VTM-0 | VTM-0 | Nonstandard | | | VTM-1 | VTM-1 |

[1]Burning time of each test sample

As is clear from the results of the above Table 1 and 2, it was understood that Comparative examples from 1 to 3 are non flame-retardant for the reason that a flame retardant was not added, Comparative example 4 wherein aromatic phosphate was added had poor dispersing properties of aqueous resin, Comparative example 5 wherein triethyl phosphate was added was poor especially in the hydrolysis resistance and the surface bleeding properties, and also Comparative example 6 wherein phosphorus-containing polyol which was not expressed in the general formula (1) and was not comprised in the present invention was blended had poor flame retardancy. In contrast, it was confirmed that the present invention wherein specified phosphorus-containing polyol represented by the general formula (1) was blended was excellent in all of the hydrolysis resistance, bleeding properties and flame retardancy.

INDUSTRIAL APPLICABILITY

The aqueous polyurethane resin composition for flame retardant coated materials of the present invention is remarkably useful for industry, since it can provide coated articles having excellent flame retardancy as well as it has no bleeding on the coated film surface, and also since harmful substances such as dioxin are not produced when burned and environmental hormones are not used, due to the use of the nonhalogen phosphorus-containing polyol as a component expressing flame retardancy.

What is claimed is:

1. An aqueous polyurethane resin composition suitable for use to produce a flame retardant coated material, consisting of an aqueous dispersion of a polyurethane resin obtained by extending a chain of an urethane prepolymer in an aqueous dispersion which is obtained by reacting (a) a polyisocyanate component with (b) a polyol component which contains a phosphorus-containing polyol compound represented by formula (1) then dispersing the obtained prepolymer in water, wherein a unit corresponding to the compound represented by formula (1) is contained so that the phosphorus content in the polyurethane resin solid is 0.7 to 5.0 mass percent based on the polyurethane resin;

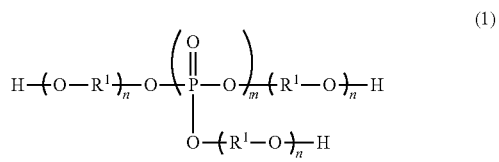

(1)

$R^1$ in the formula (1) represents an alkylene group having 2 to 4 carbon atoms, and m and n each independently represent a number from 1 to 10 and optionally a light stabilizer, an antioxidant, an ultraviolet absorber, a pigment, a dye compound, a tarnish auxiliary agent, a curing agent, a blocking agent, a radical scavenger, a heat resistance-imparting agent, an organic or inorganic filler, a plasticizer, a lubricant, an antistatic agent, a reinforcing agent, a catalyst, a thixotropy agent, an antibacterial agent, a mildew-proofing agent, an anticorrosion agent, an antifoaming agent, a non-associated form thickening agent, an organic solvent, a surface conditioner or an anti-settling agent.

2. The aqueous polyurethane resin composition for flame retardant coated materials described in claim 1, wherein m in the above general formula (1) is a number from 2 to 5.

3. The aqueous polyurethane resin composition for flame retardant coated materials described in claim 1, wherein n in the above general formula (1) is a number from 2 to 3.

4. Coated articles obtained by coating the aqueous polyurethane resin composition for flame retardant coated materials described in claim 1.

* * * * *